3,380,837
CORROSION INHIBITING COMPOSITION
Frank Larkin Wagner and Martin Grayson, Norwalk, Conn., assignors to American Cyanamid Company, Stamford, Conn., a corporation of Maine
No Drawing. Continuation-in-part of application Ser. No. 270,198, Apr. 3, 1963. This application Nov. 2, 1966, Ser. No. 591,433
5 Claims. (Cl. 106—14)

ABSTRACT OF THE DISCLOSURE

This invention relates to the provision of a corrosion inhibiting composition in which the corrosion-inhibiting material is a compound of the formula:

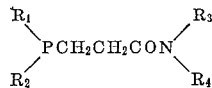

wherein $R_1$ and $R_2$ are individually either alkyl of 2–10 carbon atoms or cycloalkyl radicals, each of which may be substituted by a member selected from the group consisting of phenyl, halogen, lower alkoxy and cyano, $R_3$ is an alkyl radical of 10–20 carbon atoms which may be substituted by a member selected from the group consisting of phenyl, halogen, lower alkoxy and cyano, and $R_4$ is either hydrogen or an alkyl radical of 10–20 carbon atoms which may be substituted by a member selected from the group consisting of phenyl, halogen, lower alkoxy and cyano.

The invention relates further to the provision of steel articles coated with a corrosion inhibiting amount of the above described corrosion inhibitor.

---

This application is a continuation-in-part of application Serial No. 270,198, filed April 3, 1963, now abandoned, which in turn is a continuation-in-part of Serial No. 174,702, filed February 21, 1962, now abandoned.

Generally stated, the subject matter of the present invention relates to a new and useful corrosion inhibiting composition comprising an organic phosphorous compound. More particularly, the invention relates to a corrosion inhibiting composition comprising an alkyl-substituted β-phosphinyl-propionamide, as well as the process of employing same to improve the corrosion resistance of metals. Furthermore, the invention relates to a novel process of preparing alkyl-substituted β-phosphinyl-propionamides.

The following generally sets forth the novel process employed in the preparation of the alkyl-substituted β-phosphinyl-propionamides utilized in the novel composition of the present invention, and it should be clearly evident from the following representation that a secondary phosphine is reacted with an alkylated acrylamide to produce the alkyl-substituted β-phosphinyl-propionamides employed in the novel composition of the present invention:

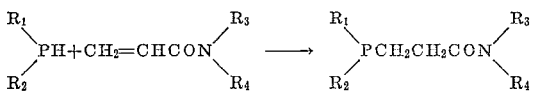

In the above representation $R_1$ and $R_2$ are members selected from the group consisting of alkyl, and substituted alkyl, said alkyl groups having from 2 to 8 carbon atoms, cycloalkyl and substituted cycloalkyl in which the substituent is a member selected from the group consisting of phenyl, halogen, lower alkoxy, and cyano, $R_3$ is a member selected from the group consisting of alkyl and substituted alkyl, said alkyl groups having from 10 to 20 carbon atoms and $R_4$ is a member selected from the group consisting of hydrogen, alkyl and substituted alkyl, said alkyl groups having from 10 to 20 carbon atoms.

Prior to the advent of the present invention, it was not known that an olefinically unsaturated reactant could combine with an organic phosphine unless a free radical initiator, or a basic catalyst was employed. Quite surprisingly, the process of the present invention proceeds very smoothly to completion without the need for a catalytic agent, producing very generous yields.

It has been found that the best results are achieved by bringing the reactants together in a solvent medium, preferably an inert organic solvent such as benzene, toluene, xylene, tetrahydrofuran, dialkyl ethers, dioxane, hexane, pentane and octane among others.

While the above reaction may be carried out at a wide range of temperatures, it is preferred to employ temperatures within the range of from about 25 to 150° C., the choice of temperature relating to the particular solvent employed in the reaction. In addition, the temperature of the reaction will vary depending on the atmospheric conditions of the environment in which the reaction takes place, thereby enabling utilization of temperatures which fall both above and below the preferred range hereinabove set forth. Lastly, the above process may be carried out in a batch, semicontinuous, or continuous manner.

The ratio of secondary phosphine to acrylamide generally employed in the above reaction is 1:1, determined on the basis of molarity; however, an excess of either reactant may be used without substantially modifying the nature of the reaction. It follows, therefore, that while stoichiometric amounts are desirable the ratio is not critical. Furthermore, the mixing sequence may be varied as desired.

Illustrative of compounds which may be prepared by employing the novel process of the present invention, as well as utilized in the novel composition of the present invention are: bis(2-cyanoethyl)phosphine, diethylphosphine, dioctylphosphine, dicyclohexylphosphine, dicyclopentylphosphine, ethylpentylphosphine, bis(trifluoroethyl)phosphine, bis(2-butoxyethyl)phosphine and dipropylphosphine among others.

Therefore, the invention relates to a corrosion inhibiting composition which comprises a compound of the formula:

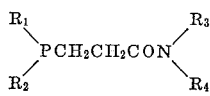

wherein $R_1$ and $R_2$ are selected from the group consisting of alkyl, substituted alkyl, said alkyl groups having from 2 to 10 carbon atoms, cycloalkyl and substituted cycloalkyl in which the substituent is a member selected from the group consisting of phenyl, halogen, lower alkoxy, and cyano, $R_3$ is a member selected from the group consisting of alkyl, and substituted alkyl, said alkyl groups having 10 to 20 carbon atoms and $R_2$ is a member selected from the group consisting of hydrogen, alkyl and substituted alkyl, said alkyl groups having from 10 to 20 carbon atoms, in a suitable vehicle. In addition, the invention relates to a steel article of manufacture coated with the composition hereinabove set forth.

Furthermore, the invention relates to a process of preparing a compound of the formula:

$$\begin{matrix} R_1 & & R_3 \\ & \diagdown & \diagup \\ & PCH_2CH_2CON & \\ & \diagup & \diagdown \\ R_2 & & R_4 \end{matrix}$$

which comprises reacting a secondary phosphine of the formula:

$$\begin{matrix} R_1 \\ \diagdown \\ PH \\ \diagup \\ R_2 \end{matrix}$$

with a substituted acrylamide of the formula:

$$\begin{matrix} & & R_3 \\ & & \diagup \\ CH_2CHCON & \\ & & \diagdown \\ & & R_4 \end{matrix}$$

in the presence of an inert solvent and recovering the corresponding product of the formula hereinabove set forth, in which $R_1$ and $R_2$ are selected from the group consisting of alkyl, substituted alkyl, said alkyl groups having from 2 to 10 carbon atoms, cycloalkyl and substituted cycloalkyl in which the substituent is a member selected from the group consisting of phenyl, halogen, lower alkoxy, and cyano, $R_3$ is a member selected from the group consisting of alkyl and substituted alkyl, said alkyl groups having from 10 to 20 carbon atoms and $R_4$ is a member selected from the group consisting of hydrogen, alkyl and substituted alkyl, said alkyl groups having from 10 to 20 carbon atoms in a suitable vehicle.

stantially cover the surface of the steel. Clearly, the more thorough the coverage the greater will be the corrosion inhibition achieved. Corrosion inhibition can be realized with as little coating as 0.1 mg. up to 20 mg. per square inch of the metal surface.

Corrosion as herein employed shall be defined to mean that process of gradual disintegration, or decomposition of a chemical nature of a metal.

The following examples are provided for illustrative purposes and may include particular features of the invention, however, the examples should not be construed as limiting the invention, many variations of which are possible without departing from the spirit or scope thereof.

Example I.—Preparation of 2-(di-n-butylphosphinyl)-N-(2-dodecyl)propionamide

A 9.5 gm. portion of N-dodecylacrylamide in 60 ml. of benzene is reacted with 5.85 gm. of dibutylphosphine in 50 ml. of benzene, warmed to 70° C. under a nitrogen atmosphere. The N-dodecylacrylamide is slowly added to the warmed dibutylphosphine over a 20 minute period. The resulting reaction mixture is then refluxed for approximately 4 hours at a temperature of 80° C. The solvent is removed by distillation, and 2-(di-n-butylphosphinyl)-N-(2-dodecyl)propionamide is recovered.

Example II–X.—Preparation of alkyl substituted β-phosphinyl propionamides

The following examples, set forth in tabular form, are carried out in substantially the same manner as set forth in Example I:

$$\begin{matrix} R^1 & & & & R^3 & & R^1 & & R^3 \\ \diagdown & & & & \diagup & & \diagdown & & \diagup \\ & PH & + & CH_2=CHCON & & \longrightarrow & & PCH_2CH_2CON & \\ \diagup & & & & \diagdown & & \diagup & & \diagdown \\ R^2 & & & & R^4 & & R^2 & & R^4 \end{matrix}$$

| Ex. No. | $R^1$ | $R^2$ | $R^3$ | $R^4$ | Mole Ratio A:B | Temp., °C. | Solvent |
|---|---|---|---|---|---|---|---|
| II | $CNCH_2CH_2-$ | $CNCH_2CH_2-$ | Pentadecyl | Pentadecyl | 0.8:1 | 130 | Xylene. |
| III | $CH_3CH_2-$ | $CH_3CH_2-$ | Octadecyl | Octadecyl | 1:1 | 65 | Tetrahydrofuran. |
| IV | $CH_3(CH_2)_6CH_2-$ | $CH_3(CH_2)_6CH_2-$ | Hexadecyl | H | 1:1 | 100 | Dioxane. |
| V | 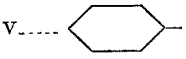 |  | Decyl | Undecyl | 1:3:1 | 80 | Benzene. |
| VI | 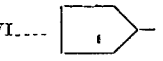 | 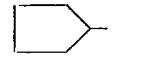 | 2-chlorooctadecyl | H | 2.0:1 | 25 | Diethylether. |
| VII | $CH_3CH_2-$ | $CH_3(CH_2)_3CH_2-$ | 3-ethoxy-pentadecyl | H | 0.6:1 | 25 | Dipropylether. |
| VIII | $Cl_3C-CH_2-$ | $Cl_3C-CH_2-$ | Eicosyl | H | 1.8:1 | 25 | Pentane. |
| IX | $CH_3(CH_2)_2CH_2OCH_2CH_2-$ | $CH_3(CH_2)_2CH_2OCH_2CH_2-$ | Undecyl | Undecyl | 1:1 | 50 | Benzene. |
| X | 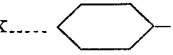$-CH_2-CH_2-$ | 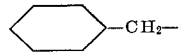$-CH_2-CH_2-$ | Decyl | Dodecyl | 1:2 | 35 | Hexane. |

The novel compositions of the present invention are useful corrosion inhibitors, which characteristic will be clearly illustrated by the examples hereinafter set forth, for example, a methanol-water mixture containing up to about 15% preferably below about 5%, of the alkyl-substituted β-phosphinyl-propionamide may be prepared and mild steel coupons dipped therein for a short period of time, approximately 20 to 50 seconds and subsequent to drying, exposing the coupons to moisture for a number of days.

It should be readily obvious that the vehicle employed in the novel composition of the present invention includes such vehicles as a methanol-water mixture, ethanol, propanol, ethers, aromatic hydrocarbons and normal hydrocarbons among others. The novel composition of the present invention may be applied to the particular metal in which corrosion inhibition is desired by either spraying, dipping, or rolling said composition onto the metal. It is only necessary that a sufficient coating be applied to sub- Example XI.—Utilization of the inventive concept of the present invention This example demonstrates the utilization of the novel process of the present invention in treating steel, and the improved corrosion resistance thereby achieved.

A series of six thoroughly cleaned mild steel coupons are treated in a 2% solution of 2-(di-n-butylphosphinyl)-N-(2-dodecyl)propionamide in a methanol-water mixture for approximately 30 seconds. The coupons are then dried by draining, and further dried in an oven at approximately 110° C. for 10 minutes. The coupons are cooled to room temperature, and each coupon is placed in a separate container of water. Subsequent to 5 days of immersion the coupons are examined for rust. No rust is visible on the surface of the treated coupons; however, six control coupons treated in exactly the same manner, employing a methanol-water mixture only, are severely rusted in a period of 3 hours.

Example XII.—Utilization of the inventive concept of the present invention

This example demonstrates the utilization of the novel process of the present invention in treating steel, and the improved corrosion resistance thereby achieved.

A series of thirty thoroughly cleaned mild steel coupons are coated with amounts varying between 0.1 to 23.3 ml. of a 2% solution of 2-(di-n-butylphosphinyl)-N-(2-dodecyl)propionamide in a methanol-water mixture. The coupons are then drain dried, and further dried in an oven at 110° C. for 10 minutes. The coupons are cooled to room temperature, and each coupon is placed in a separate container of water. Upon visual examination it will be seen that rust formation is considerably inhibited on the treated coupons when compared with untreated but otherwise identically treated, control coupons. Subsequent to 8 days immersion it will be readily apparent that coupons treated with 0.5 ml. or more of the 2-(di-n-butyl-phosphinyl) - N - 2 - dodecylpropionamide are completely rust free.

Although the invention has been described and illustrated by reference to particular embodiments thereof, it will be understood that in its broadest aspects the invention is not limited to such embodiments, and that variations and substitution of such equivalents may be resorted to within the scope of the appended claims.

We claim:

1. A composition of matter which is suitable for application to steel surfaces for the purpose of depositing a corrosion inhibiting coating thereto, which comprises a mixture of a liquid vehicle which can be applied to steel surfaces and an effective amount of a corrosion-inhibiting compound of the formula:

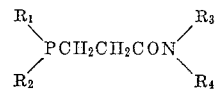

wherein $R_1$ and $R_2$ are individually either alkyl of 2–10 carbon atoms or cycloalkyl radicals, each of which may be substituted by a member selected from the group consisting of phenyl, halogen, lower alkoxy and cyano, $R_3$ is an alkyl radical of 10–20 carbon atoms which may be substituted by a member selected from the group consisting of phenyl, halogen, lower alkoxy and cyano, and $R_4$ is either hydrogen or an alkyl radical of 10–20 carbon atoms which may be substituted by a member selected from the group consisting of phenyl, halogen, lower alkoxy and cyano.

2. A composition according to claim 1 in which the concentration is 15%.

3. A composition according to claim 1 in which $R_1$ and $R_2$ are butyl, $R_3$ is 2-dodecyl and $R_4$ is hydrogen.

4. A composition according to claim 3 in which the vehicle is a methanol-water mixture.

5. A steel article of manufacture coated with a corrosion inhibiting amount of the composition of claim 1.

References Cited
UNITED STATES PATENTS 3,005,013  10/1961  Grayson et al. _____ 260—464
3,116,317  12/1963  Grayson et al. _____ 260—465.1

ALEXANDER H. BRODMERKEL, *Primary Examiner.*

L. B. HAYES, *Assistant Examiner.*

UNITED STATES PATENT OFFICE
CERTIFICATE OF CORRECTION

Patent No. 3,380,837                        April 30, 1968

Frank Larkin Wagner et al.

It is certified that error appears in the above identified patent and that said Letters Patent are hereby corrected as shown below:

Column 2, line 62, after "having" insert -- from --.
Column 3, line 16, the formula should appear as shown below:

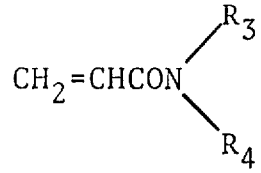

Column 5, line 21, "-N-2-dodecylpropionamide" should read
-- -N-(2-dodecyl)propionamide --.

Signed and sealed this 16th day of December 1969.

(SEAL)

Attest:

Edward M. Fletcher, Jr.                     WILLIAM E. SCHUYLER, JR.

Attesting Officer                             Commissioner of Patents